United States Patent [19]

Jysky

[11] 4,406,330

[45] * Sep. 27, 1983

[54] METHOD OF BINDING DUST

[75] Inventor: Goran H. Jysky, Nyköping, Sweden

[73] Assignee: Atlas Copco AB, Stockholm, Sweden

[ * ] Notice: The portion of the term of this patent subsequent to Feb. 23, 1999 has been disclaimed.

[21] Appl. No.: 316,024

[22] Filed: Oct. 28, 1981

Related U.S. Application Data

[63] Continuation-in-part of Ser. No. 178,414, Aug. 15, 1980, Pat. No. 4,316,514.

[30] Foreign Application Priority Data

Aug. 22, 1979 [SE] Sweden .............................. 7907026

[51] Int. Cl.[3] ...................... E21C 7/02; B01D 45/12; B01D 46/48

[52] U.S. Cl. ........................................ 175/66; 55/1; 55/96; 55/315; 55/385 D

[58] Field of Search ...................... 55/1, 96, 235, 315, 55/385 D, 431, 432, 466, 468; 175/66, 88, 206, 209, 210, 211; 366/195

[56] References Cited

U.S. PATENT DOCUMENTS

| | | | |
|---|---|---|---|
| 1,161,263 | 11/1915 | Spencer | 55/235 |
| 1,557,123 | 10/1925 | Vreeland | 55/1 |
| 1,781,352 | 11/1930 | Tolman, Jr. et al. | 55/468 |
| 2,304,744 | 12/1942 | Snyder | 366/195 |
| 2,308,365 | 1/1943 | Hornbrook | 55/432 |
| 2,857,854 | 10/1958 | Yellott et al. | 55/431 |
| 2,890,081 | 6/1959 | Terrett | 55/432 |
| 4,223,748 | 9/1980 | Barendsen | 175/66 |
| 4,277,263 | 7/1981 | Bergeron | 175/206 |
| 4,284,422 | 8/1981 | Ferland | 175/66 |
| 4,316,514 | 2/1982 | Jysky | 55/1 |

FOREIGN PATENT DOCUMENTS

| | | | |
|---|---|---|---|
| 1051866 | 4/1979 | Canada | 175/206 |
| 914722 | 5/1954 | Fed. Rep. of Germany | 175/206 |

*Primary Examiner*—David L. Lacey
*Attorney, Agent, or Firm*—Sughrue, Mion, Zinn, Macpeak and Seas

[57] ABSTRACT

In rock drilling, the dust-laden flushing air from the borehole is drawn through a coarse dust separator and a filter unit. A mixing apparatus is screwed to the bottom of the filter unit and in accordance with this invention the dust that falls from the filter unit is fed in batches to a mixing chamber of the mixing apparatus in which it is mixed with a liquid binder. The dust from the coarse dust separator is directly dumped on the ground and the fine dust from the mixing apparatus is also dumped on the ground.

6 Claims, 3 Drawing Figures

METHOD OF BINDING DUST

This application is a continuation-in-part of application Ser. No. 178,414 filed on Aug. 15, 1980, now U.S. Pat. No. 4,316,514.

BACKGROUND OF THE INVENTION

The present invention relates to a method of binding dust created when drilling rock, in which the dust is mixed is at present collected in plastic bags. The use of plastic bags or sacks, however, is encumbered with a number of disadvantages, both with respect to the necessary handling of these bags and to the cost thereof. Further, if a bag should break, the dust contained therein swirls up, creating a still greater health risk.

It has previously been proposed to bind dust with the aid of a liquid comprising of water and a suitable binder, to agglomerate the dust into a form in which it is no longer harmful to health. The dust should be bound immediately as it is created during drilling, since the freshly cut surfaces of the dust particles are then physically active, which provides a good binding effect. It is important, however, for purposes of efficiency that the dust can be bound in a manner which does not necessitate the interruption of a drilling operation.

Consequently, it has previously been considered sufficient to successively bind dust created by drilling at the rate in which it is generated. Different apparatus have been proposed to achieve this goal. One such apparatus is described in the Swedish Pat. No. 7404759-8. One of the disadvantages with such apparatus, however, is that the amount of liquid binder supplied must be continuously adapted to the amount of dust created. This is very difficult to achieve, and often impossible, since the amount of dust created varies greatly, for example, in dependence upon the hardness of the rock and the wear on the drill crown or bit.

SUMMARY OF THE INVENTION

A principle object of the present invention is to provide a method and apparatus which permit the liquid binder to be dispensed to the dust in given quantities, in a precise and simple fashion, while being mixed carefully with dust without interrupting the drilling operation, thereby eliminating the aforementioned disadvantages.

This object is achieved, in accordance with one aspect of the present invention, by mixing the dust batchwise with a liquid binder, the batches being of a predetermined magnitude, for example a magnitude corresponding to the amount of dust obtained per length of drilling rod section. Treatment of one batch thus takes place while a subsequent batch of dust is being collected. The ready-mixed batch is discharged from the apparatus before the following batch is complete.

A method according to the invention is characterized in that the dust is collected in the bottom of a dust-separating collector and is supplied in batches of given size to a mixing chamber to which a liquid binder is also fed in an amount related to the size of the batch in question. The dust and liquid are mixed by stirring while a further batch of dust is collected in the separating collector. The resultant mixture is then discharged before the next batch of dust is fed to the mixing chamber.

Preferably, the liquid binder is fed to the mixing chamber prior to a batch of dust being introduced thereinto, and the dust batch is passed to the mixing chamber gravitationally via a bottom valve arranged in the separating collector. Preferably, the bottom valve is pressure controlled, and is operated in response to the pressure difference between the collecting chamber and the mixing chamber.

According to another aspect of the invention, an apparatus for binding dust obtained when drilling rock, by mixing dust with a liquid, comprises a mixing chamber connected to a dust-separator. Batchwise feeding to the mixing chamber of dust collected in the separator is effectuated. A supply of a liquid binder is provided to the mixing chamber in an amount dependent upon the amount of dust in each batch. A mixer is arranged in the mixing chamber for mixing dust and liquid by stirring. Finally, a discharge device releases the resultant mixture before the next batch of dust is supplied to the mixing chamber.

Examples of the method and apparatus of the invention will now be described with reference to the accompanying drawing.

DESCRIPTION OF THE PREFERRED EMBODIMENTS

Figure 1:
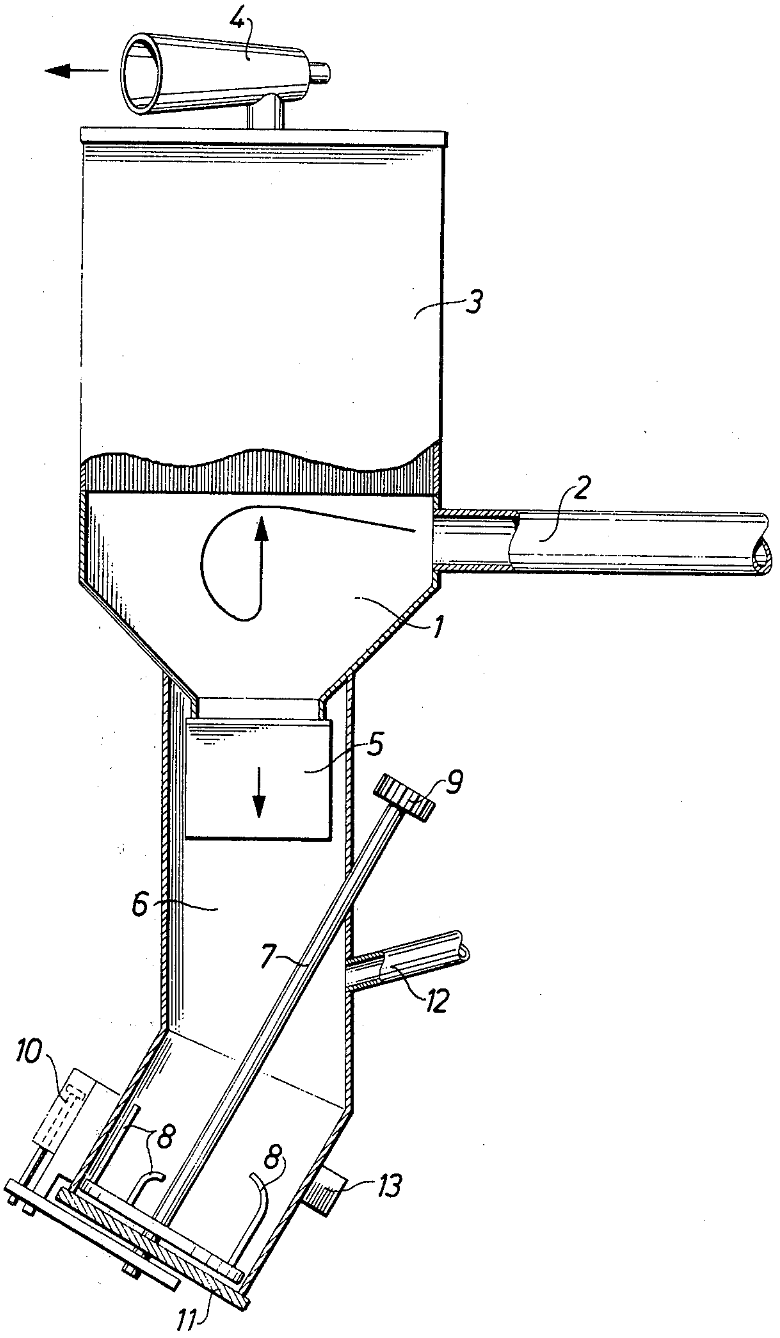
FIG. 1 is a schematic side partial cutaway view of one embodiment of this invention.

In FIG. 1, number 1 is a cyclone to which air containing dust is passed via a line 2 extending from a drill hole. The cyclone 1 is combined with a filter element 3 in a conventional manner. Element 4 is an ejector arranged to create a subatmospheric pressure in the cyclone 1 and the filter unit 3, and the outlet of the ejector communicates with the surrounding atmosphere. Arranged in the bottom of the cyclone 1 is a pressure-controlled valve 5 via which the cyclone can be placed in communication with a mixing chamber 6. In the illustrated embodiment, the valve 5 comprises a so-called "rubber valve," which in its simplest form comprises a readily compressible rubber hose. When a pressure below ambient pressure prevails in the cyclone 1, because of the action of the ejector 4, the rubber hose will collapse as a result of the pressure prevailing in the mixing chamber 6, thereby closing the valve. When the ejector 4 is disconnected, the hose is opened due to the equalization of pressure between the cyclone 1 and the chamber 6.

The mixing chamber 6 is provided with an agitator which includes an agitator element 8 and which can be rotated via a shaft 7. The chamber 6 is angled so that the shaft 7 can be driven via a gear drive located on the outside of the chamber. This obviates the need for bevel-gear drives or the like. The lower end of the chamber 6 is closed by means of a closing element 11 operated by a double-acting air cylinder 10. Element 12 is an inlet for binding liquid, while the number 13 identifies a vibrator.

The mode of operation of FIG. 1 will now be described. When carrying out a drilling operation, the ejector 4 is rendered operative, whereas air laden with dust is drawn by suction into the cyclone 1. The bottom valve 5 is closed as a result of the under-pressure prevailing in the cyclone. Dust separated in the cyclone 1 and the filter unit 3 falls down onto the bottom of the cyclone, where it is collected. When a distance corresponding, for example, to the length of one drilling rod has been drilled, and a further drilling rod is to be assembled, so to lengthen the drill, the ejector 4 is cut-off. The pressure in the cyclone 1 will then rise and the valve 5 is opened, so the batch of dust collected in the cyclone 1 falls down into the mixing chamber 6.

In conjunction herewith, the filter incorporated in the unit 3 is suitably vibrated, so that dust held in the filter also falls down into the mixing chamber 6. Prior to this, a given amount of a liquid binder, comprising water and some percent by volume of a suitable organic binder of known kind, has been introduced into the mixing chamber. The amount is determined in dependence upon the size of the batch of dust passed to the mixing chamber. In the described embodiment, the amount of binding liquid added has been determined in dependence upon the length of a drillingrod section and the diameter of the drilling crown or bit.

The dust is mixed with the liquid in the mixing chamber 6, whose bottom flap 11 is closed, by means of the rotary agitator means provided with said agitator element 8. This mixing operation can be continued while the next drill length is drilled, and fresh dust is collected on the bottom of the cyclone 1, the bottom valve 5 of said cyclone being reclosed as a result of the action of the reconnected ejector 4. Thus, since mixing of the dust with the binding liquid can be continued for a relatively long time, for example, several minutes, a highly homogenous mixture in which substantially all dust is bound is thereby obtained. Further, only a minimal amount of liquid is required, in the order of magnitude of 15 cl per litre of dust. The readymixed mass, which now has a doughy consistency, is discharged by opening the flap 11 by means of the air cylinder 10. This can be effectuated immediately prior to reconnecting the ejector 4 in conjunction with changing a drilling rod and/or vibrating the filter. To facilitate discharge of the ready-mixed mass there can be used, for example, a vibrator 13 which is connected to the wall of the mixing chamber 6.

As soon as the ready-mixed mass has been discharged from the apparatus, the bottom flap 11 is reclosed and a further amount of liquid binder is supplied via the inlet 12. This amount is adjusted to the amount of dust collected on the bottom of the cyclone 1 and enters the mixing chamber. The binding liquid is suitably fed at such a pressure, about 6 atmospheres, and with such a spread to clean out the mixing chamber 6 as the liquid is injected thereinto. The mixing arrangement may be driven, for example, by means of a hydraulic motor which, as beforementioned, can be effectuated without the use of bevel-gear drives or the like, owing to the fact that the mixing chamber 6 is angled. This enables the drive 9 arranged on the shaft 7 to be reached from outside the apparatus.

As will be understood from the description of this embodiment, binding of the dust in accordance with the invention does not affect the drilling operation, since both the mixing of a batch of dust and the supplying of the binding liquid for the subsequent batch are carried out during a drilling operation. Transfer of dust collected in the cyclone 1 to the mixing chamber 6 is accomplished when it is necessary to interrupt the drilling operation, for the purpose of changing a drilling rod or the like measure. No other form of interruption is necessary when binding dust in accordance with the invention.

Further, as mentioned, the binding liquid can be metered to the apparatus very precisely, since the amount of dust generated per length of drilling rod can be readily calculated with knowledge of the length of the drilling rod and the diameter of the drill bit. Thus, it is not necessary to vary the amount of liquid metered to the apparatus during a drilling operation in dependence of whether hard or loose rock is being drilled and in dependence on the condition of the drill bit. Further, it is essential that mixing of the dust and binding liquid can be continued for a length of time such as to ensure positive binding of substantially all the dust.

Figure 2:
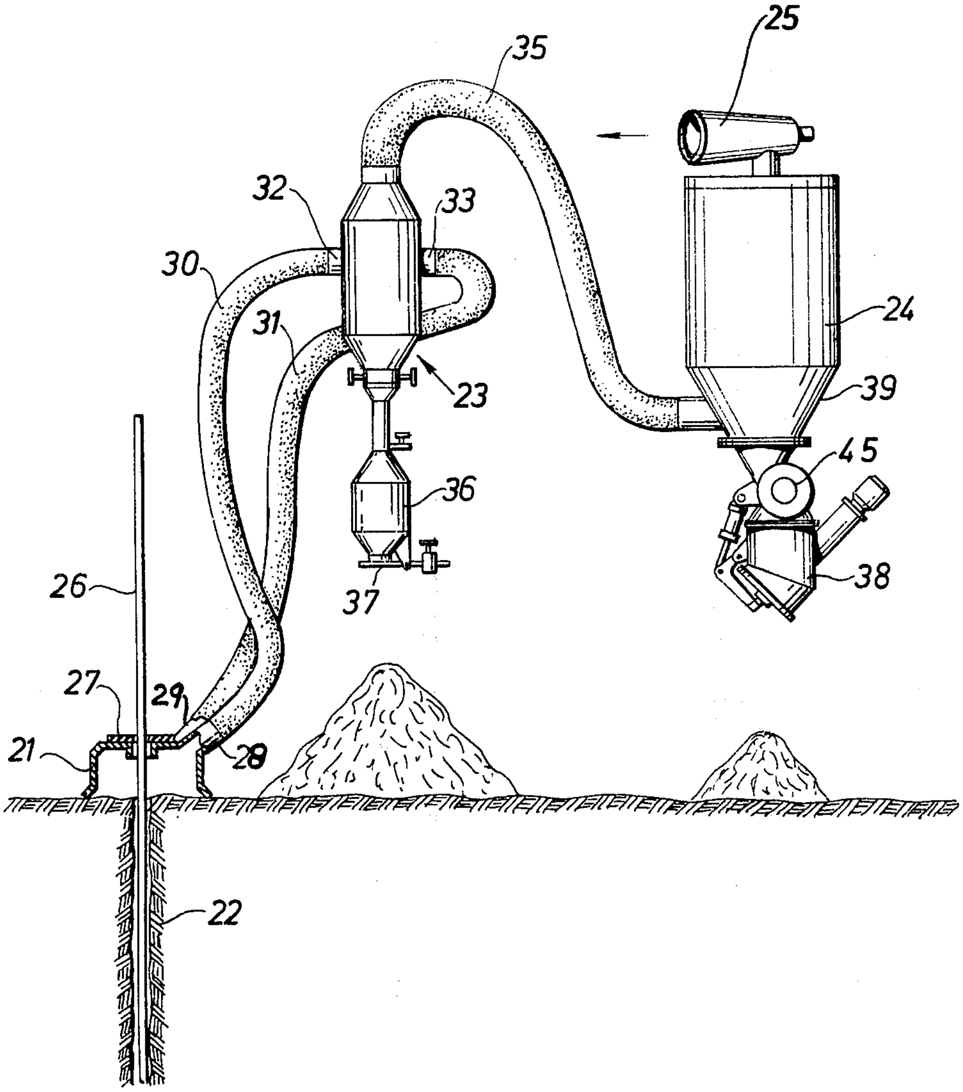
FIG. 2 is a schematic view of the overall dust collecting suction system.
Figure 3:
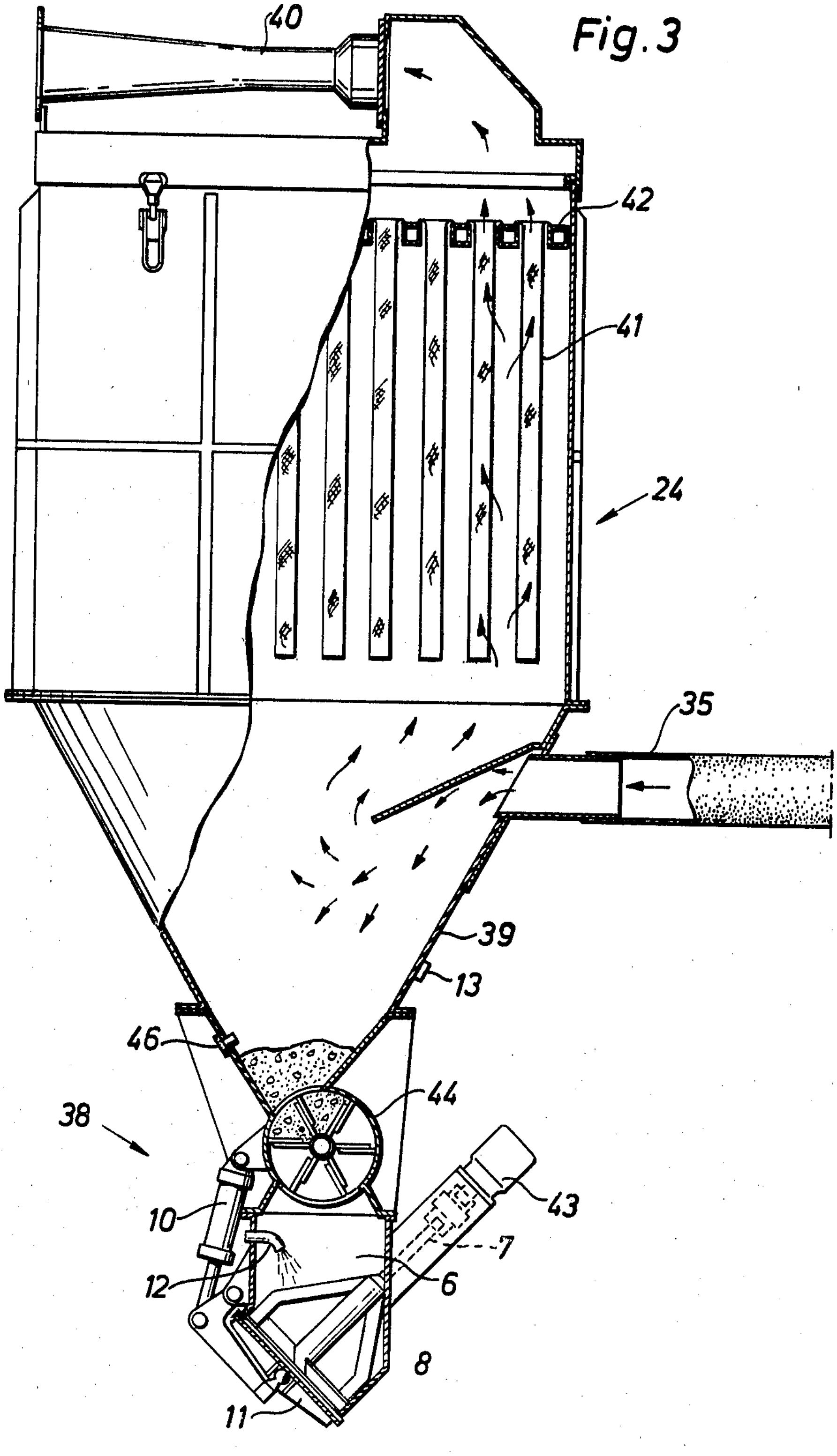
FIG. 3 is a cutaway section of the filter unit and mixing apparatus of FIG. 2.

Referring now to FIGS. 2 and 3, a second embodiment is shown. In FIG. 2 a complete dust collecting system is shown whereas in FIG. 3 only the filtering and mixing apparatus thereof is shown. The dust collecting suction system, shown in FIG. 2 generally similar to that described in U.S. Pat. No. 4,223,748, comprises a hood 21 located over the mouth of a borehole 22, a separator 23 for coarse dust and filter unit 24 with an ejector 25. A drill stem 26 for drilling the borehole extends through the hood 21 that has a rubber seal 27 that seals against the drill stem 26. In place of the ejector 25 an electric fan may be used in locations where there is a supply of electricity.

When the suction system is used for example on crawler drill wagons, both the separator 23 and the filter unit 24 can be mounted on the frame of the crawler wagon. The hood 21 can then either be a loose hood or it can be mounted on the feed beam for the rock drill that operates the drill stem 26. Since the drilling apparatus itself is not part of the invention, only the drill stem 26 of the drilling apparatus is illustrated.

The hood 21 has two fittings 28, 29 for flexible hoses 30, 31 which have their other ends coupled to two fittings 32, 33 on the coarse dust separator 23. A hose 35 leads from an outlet on the top of the separator 23 to the filter unit 24. The separator 23 is provided with a container 36 that has a door 37 with a counterweight.

A mixing apparatus 38 is screwed to the hopper-like bottom 39 of the filter unit 24. The filter unit 24 and the mixing apparatus are shown in more detail in FIG. 3. In the filter unit, shown in FIG. 3, there are a plurality of flat filter bags 41 that have long narrow mouths. The filter bags 41 are mounted in a partition 42 and they have interior wire cages that prevent them from collapsing. Similar to the mixing apparatus of FIG. 1, the mixing apparatus of FIg. 3 comprises a mixing chamber 6, an agitator 8 mounted on a shaft 7, a door 11, a power cylinder 10 for operating the door, an inlet 12 for a liquid binder and a vibrator 13. A motor 43 is shown which is coupled to rotate the shaft 7. A rotating positive displacement feeder 44 is used instead of the feeding valve 5 in FIG. 1. The feeder 44 is rotated by a motor 45 shown in FIG. 2. A sensor 46 is coupled to detect the amount of dust in the hopper 39.

During drilling, the ejector 25 (or fan depending on availability of electricity) draws air from the filter unit 24 so that there will be subpressure in the entire system, and, as a result, the dust-carrying flushing air that flows out of the borehole, is drawn through the coarse dust separator 23 and the filter unit 24.

The coarse dust separator 23 can preferably be of the kind described in U.S. Pat. No. 4,223,748 and it will therefore not be described in detail. It separates coarse dust that is not hazardous to the health and the collected coarse dust can be dumped on the ground without previously being treated with a binder. More than 50%, usually more than 70%, of the dust can be separated as coarse dust. It is advantageous to have a coarse dust separator since this component reduces the load on the filter unit and mixing apparatus 38. It is also advantageous since it reduces the amount of binder necessary to mix with the dust. The binder is usually a water solution of a hygroscopic salt. The reduction depends mainly on the reduction in the amount of dust. However, a smaller percentage of liquid is needed when there is only fine dust as compared to a mixture of coarse and fine dust. The apparatus of FIG. 1 can also be alternatively coupled directly to a suction hood or indirectly to a suction hood via a separate coarse dust separator of the kind described with reference to FIG. 3.

The filter bags 41 are cleaned by the use of repeated air pulses each time the drilling is interrupted so that a batch of dust falls from the filters. The apparatus of FIG. 3 is advantageous over the apparatus of FIG. 1 in that the batches of dust fed to the mixing chamber 6 may be smaller than the dust batches falling from the filter bags since the feeder 44 is able to feed the dust also when there is suction in the collecting system. Also, more than one mixing cycle can be carried out during one drilling cycle. Thus, the mixing apparatus can be smaller.

What is claimed is:

1. In a method of collecting and binding dust created when drilling rock, by collecting the dust laden air that flows out of the borehole being drilled and conveying the dust to a separating means and feeding the separated dust to a mixing chamber to which a liquid binder is applied, the improvement comprising the steps of; conveying dust laden air from said borehole through a coarse dust separator to separate coarse dust from fine dust, feeding fine dust to the mixing chamber in batches of given size, and supplying said liquid binder to the mixing chamber in amounts related to the size of the batches of fine dust, mixing the fine dust and liquid by stirring while a further batch of fine dust is collected in the separating means, and discharging the resultant mixture before the next batch of fine dust is fed to the mixing chamber.

2. A method according to claim 1 comprising the step of dumping the resultant mixture directly on the ground.

3. The method according to claim 2 comprising the step of dumping the coarse dust collected in the coarse dust separator and the resultant mixture from the mixing chamber separately on the ground.

4. A method according to claims 1, 2 or 3 comprising the step of supplying said liquid binder first to said mixing chamber at a pressure of such magnitude and in such a manner to provide a cleaning effect on the mixing chamber, and then feeding the fine dust batch to the mixing chamber.

5. A method according to claims 1, 2 or 3 wherein said separating means comprises a filter unit and further including the step of applying suction to the filter unit to convey the dust laden air from the borehole and through the filter unit.

6. A method according to claim 5 wherein the suction is interrupted when drilling is interrupted, and filter elements of the filter unit are cleaned when the suction is off, and the amount of dust falling from the filter elements is fed to the mixing chamber while the suction is off.

* * * * *